A. ROBERTS.
BY-PRODUCT CONDENSER.
APPLICATION FILED APR. 17, 1915, RENEWED JAN. 7, 1918.
1,333,631.
Patented Mar. 16, 1920.
3 SHEETS—SHEET 2.
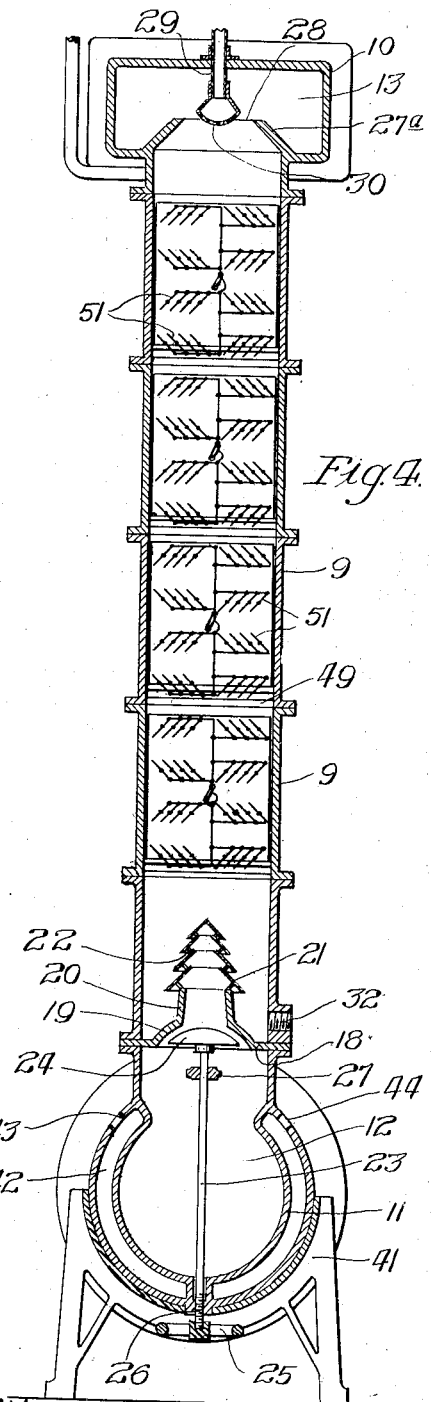
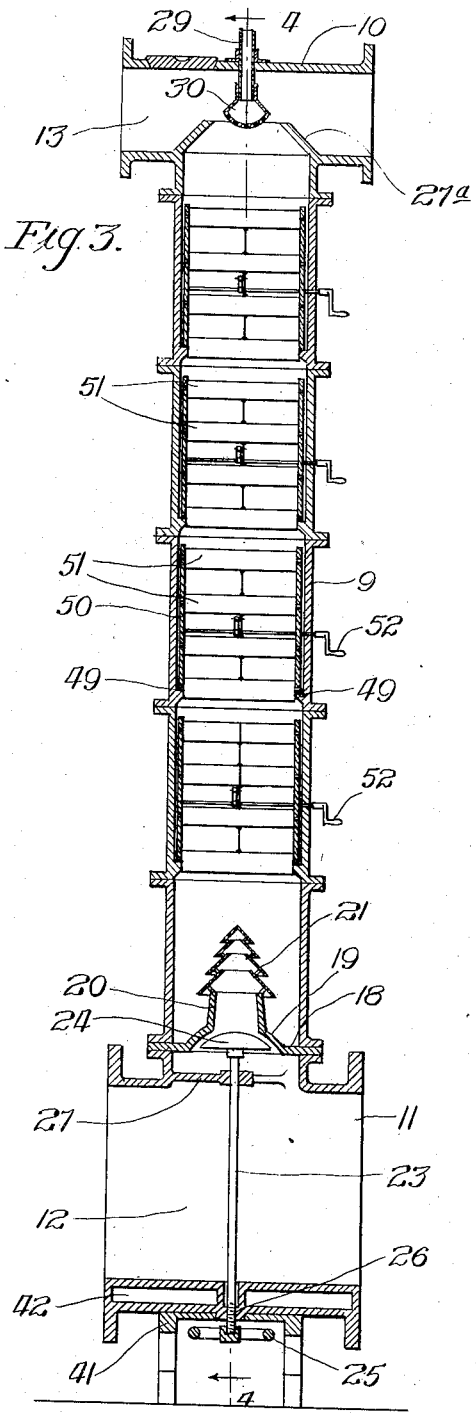
Witnesses:
Harry S. Gaither
Amy Jehle
Inventor
Arthur Roberts
by Bauum & Bauum
Attys A. ROBERTS.
BY-PRODUCT CONDENSER.
APPLICATION FILED APR. 17, 1915, RENEWED JAN. 7, 1918.
1,333,631.
Patented Mar. 16, 1920.
3 SHEETS—SHEET 3.
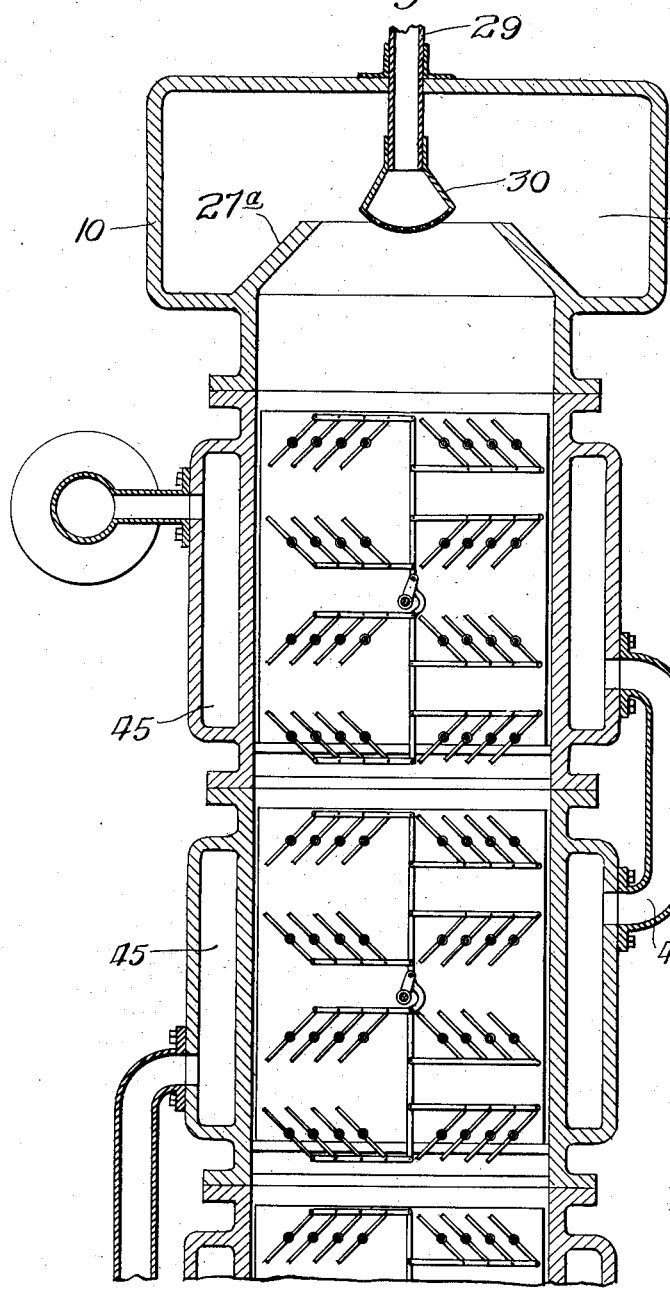
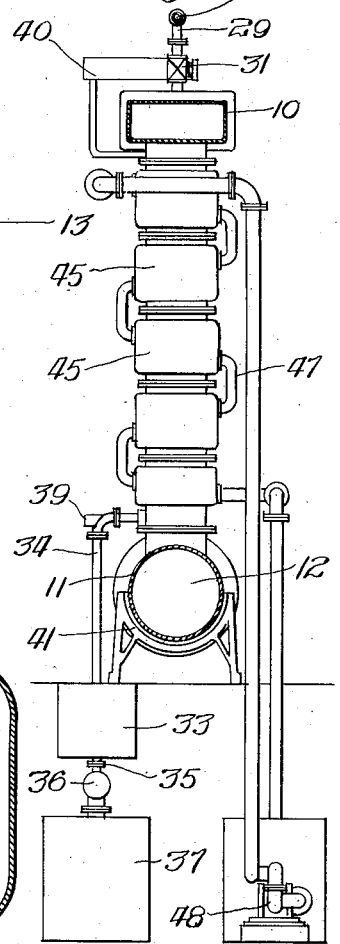
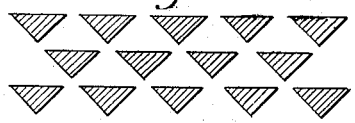
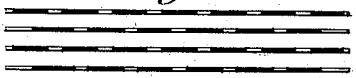

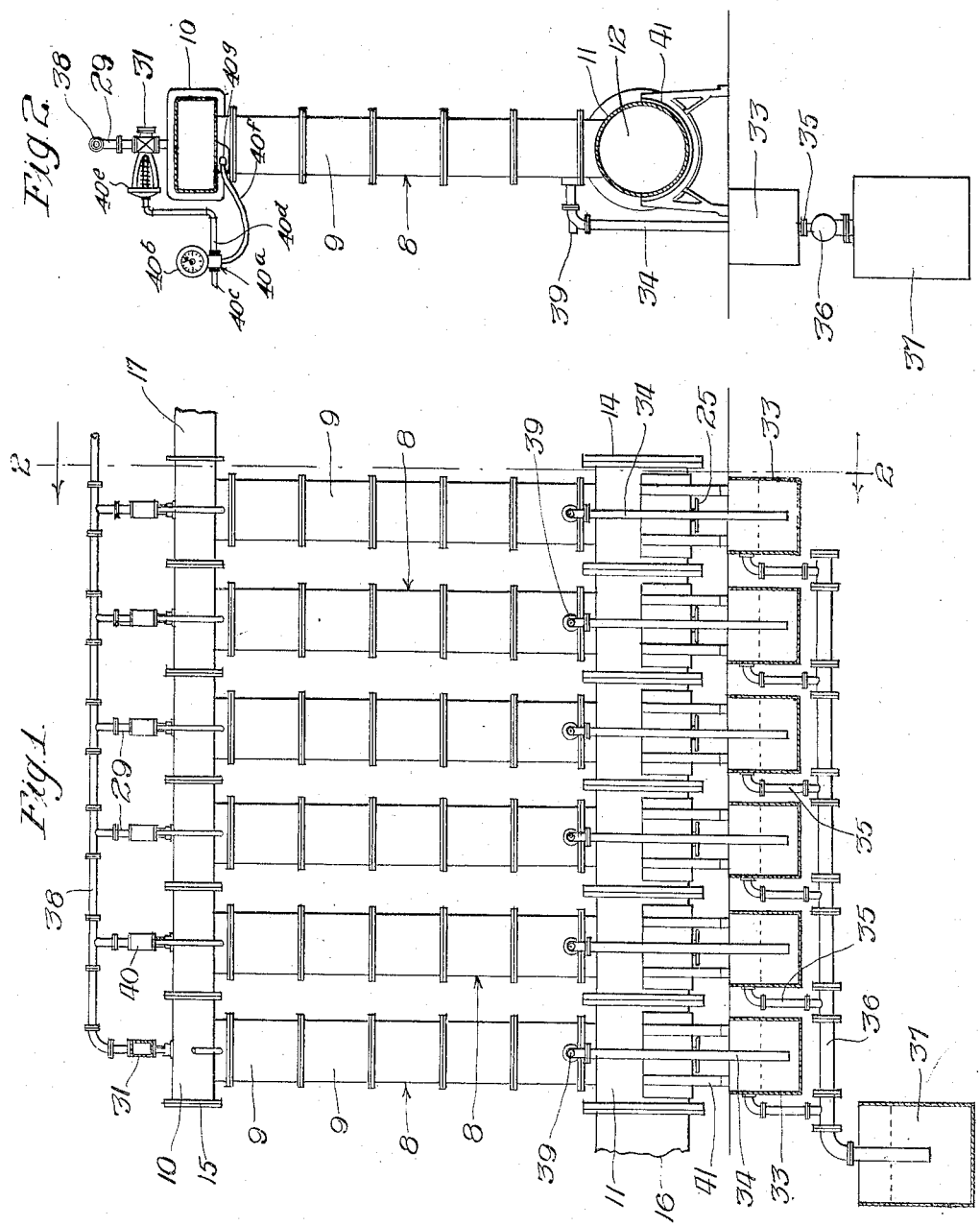

UNITED STATES PATENT OFFICE.

ARTHUR ROBERTS, OF EVANSTON, ILLINOIS, ASSIGNOR, BY MESNE ASSIGNMENTS, TO AMERICAN COKE & CHEMICAL COMPANY, OF CHICAGO, ILLINOIS, A CORPORATION OF MAINE.

BY-PRODUCT CONDENSER.

1,333,631.  Specification of Letters Patent.  Patented Mar. 16, 1920.

Application filed April 17, 1915, Serial No. 22,146. Renewed January 7, 1918. Serial No. 210,772.

*To all whom it may concern:*

Be it known that I, ARTHUR ROBERTS, a citizen of the United States, residing at Evanston, Cook county, Illinois, have invented certain new and useful Improvements in By-Product Condensers, of which the following is a specification.

The present invention has reference to certain improvements in condensers which are intended particularly for use in the recovery of by-products from gases, and more particularly for the recovery of the by-products from distillate gases given off during the distillation of coal and the like. These distillate gases are complex bodies containing generally in physical mixture the vapors of various oils and other products of distillation. The kinds and characteristics of the vapors in the distillate gases depend upon the temperature and vapor tensions of the said gases. By control of these two factors the complex composition of the gases can be controlled or varied generally at the will of the operator.

If this complex gas have its temperature reduced below the dew point of any one of its separable constituents then that constituent will be precipitated in the form of an oil or liquor, and this oil or liquor may be collected and recovered as a by-product.

In the fractional precipitation of the by-products from such a complex gas, accuracy of temperature control and uniformity of operation are very desirable for the attainment of uniformly correct results.

One of the objects of the present invention is to provide a construction of condenser whereby the temperature of the gases passing through the condenser may be very accurately and uniformly regulated so as to give very uniform and dependable results.

Another object of the invention is to provide a construction of condenser such that the reduction of gas temperature for the precipitation of any given constituent may be secured by a stream or spray of liquor thrown into the body of the gas current, the operating results being controlled by variation of the size and amount of spray as compared to the volume of gas current into which the spray is thrown. By the use of the spray feature each and every portion of the gas current may be subjected to a uniform cooling action so as to insure uniform treatment of the entire body of gas current.

Another object of the invention is to provide a construction of condenser of such form that it may be readily built up from standard units, the number of units being increased or decreased from time to time or determined according to the particular installation so as to adjust the condenser capacity according to the volume and condition of the gases to be treated.

Another feature of the invention has reference to the provision of a construction such that the volmue of flow of the precipitating liquor will be automatically regulated or adjusted so as to maintain the temperature at the exact point desired for the precipitation of the oil which is being removed by the particular condenser in question.

Other objects and uses will appear from a detailed description of the invention which consists in the features of construction and combinations of parts hereinafter described and claimed.

Referring to the drawings:

Figure 1 shows a side elevation of a condenser built up from six columnar units, each comprising five rectangular sections;

Fig. 2 is a section taken on the line 2—2 of Fig. 1 looking in the direction of the arrows;

Fig. 3 is an enlarged longitudinal section through one of the columnar units;

Fig. 4 is a section taken on the line 4—4 of Fig. 3 looking in the direction of the arrows;

Fig. 5 is a view corresponding to Fig. 2 showing a modified construction of columnar unit in which the various sections are jacketed and means is provided for circulating a liquid through the jackets;

Fig. 6 is an enlarged sectional view through two of the sections of the type of construction shown in Fig. 5; and Figs. 7 and 8 are details of modified forms of baffles.

Referring to the several figures the completed condenser comprises a plurality of columnar units 8, each of which is built up from the circular sections 9. The top of each columnar unit comprises a top section 10, and the bottom thereof comprises a bottom section 11. Each of the sections 9 is cylindrical in form, and may either be rectangular, circular, elliptical or of any other desired cross section. As appears particularly from Figs. 3 and 4 each of the base portions 11 has a longitudinal bore 12, and when the several base sections are lined up, as shown in Fig. 1, these bores all communicate to provide, in effect, a manifold extending along the base portion of the complete condenser. In like manner each of the top sections 10 is provided with a bore 13, and when the several top sections are set together these bores likewise join together to produce a top manifold along the top portion of the completed condenser. The bore of the base section at one end of the completed structure is closed by a plate 14, while the bore of the top section at the other end of the completed structure is closed by a plate 15. The incoming gases enter at the corner 16 of Fig. 1 and the outgoing gases leave at the corner 17 of said figure. The travel of the gases through the condenser is therefore upwardly through all of the columnar units in parallel.

Each of the columnar units has a certain gas capacity depending, among other things, upon its cross sectional area. In order to standardize the constructions all of the sections 8 may be of uniform size and form. This being the case each columnar unit will have a capacity to treat a certain number of cubic feet of gas per day or hour, and the total capacity of the condenser may be adjusted to whatever amount may be necessary merely by adding on additional columnar units. The interval of time that the gas will be under treatment is dependent largely upon the height of the condenser, and this likewise may be adjusted according to requirements by providing each columnar unit with a greater or less number of sections 9 as desired.

The gases are treated by causing an oil or emulsion of desired characteristics to spray down through each columnar unit against the flow of the gas upwardly therethrough. The oil or emulsion spray will reduce the temperature of the gases to the desired point before the gases leave the condenser by the manifold 10, and the temperature to which the gases will thus be reduced may be accurately controlled by the constructions which I will now describe.

Across the lower portion of each columnar unit is the partition 18. This is illustrated as taking the form of a plate which is clamped in between the lower unit 9 and the corresponding base section. Each of the plates 18 preferably has its central portion bulged up to provide the valve seat 19, upwardly extending from which is the flange 20. A plurality of tapered rings 21 of graduated size surround the upper portion of the flange 20 so as to provide a hood over the same, said hood being provided with the peripheral openings 22.

Extending upwardly through each of the base sections 11 is the valve stem 23, the upper end of which carries the valve 24 which coöperates with the seat 19. The lower end of each stem extends down below the base section and is provided with the operating wheel 25. The stem 23 is threaded into the base section at the point 26 and passes through a ribbed support 27 in the upper portion of the base section. By turning the hand wheel the amount of opening between the valve and its seat can readily be adjusted to thereby control the delivery of gas upward through that particular columnar unit.

Each top section 10 has the inturned flange 27a, the center of which is open at 28. A tube or pipe 29 depends into the top section above each of the openings 28, each of said pipes carrying a spray nozzle 30 on its lower end. These spray nozzles are for the purpose of delivering the oil or emulsion into the upper ends of the columnar units, which oil or emulsion spray travels downward through the columnar unit against the upflowing stream of gas. Each of the pipes 29 is provided with a valve 31, best shown in Figs. 1 and 2, whereby the volume of the spray can be controlled or adjusted. From the foregoing it will be seen that the top manifold bore 13 extends along across the upper ends of the various columnar units, but each columnar unit is partially cut off by means of its flange 27a.

The oil or emulsion which is sprayed downward, in the various columnar units, is of lower temperature than the gas entering the base manifold. Consequently there will be a lowering of temperature of the upflowing gases by reason of the spray, and simultaneously the spray itself will be largely, if not entirely, evaporated into the body of the gas so as to pass off with the gas through the delivery manifold 13. The lowering of temperature thus effected by the delivery of latent heat of evaporation to the spray or emulsion will cause precipitation of the particular oil or other constituent which is being brought down in the condenser. This oil or constituent will collect in the bottom portions of the columnar units whence it may be withdrawn through the openings 32.

Referring to Figs. 1 and 2 I have therein illustrated a seal pot 33 adjacent to the lower end of each columnar unit, each seal pot being connected to the corresponding opening 32 by means of a pipe 34. Each seal pot overflows through a pipe 35 into a manifold 36 in which collects all of the precipitates from the entire condenser to be thence conveyed to a common reservoir 37. The various valves 31 are shown as connected to a common oil or emulsion manifold 38 through which the entire oil or emulsion supply for the condenser is delivered.

The upper end of each of the pipes 34 may be provided with a plugged opening 39 through which a thermometer may be passed for the purpose of ascertaining the temperature of the gas at the lower end of the columnar unit. At the upper end of each columnar unit is a similar temperature opening for ascertaining the temperature of the gas at the discharge end of the columnar unit, which temperature is the controlling temperature which determines the characteristics of the precipitate or constituent which is being brought down.

In order to effect automatic control of the temperature at the discharge or upper end of each columnar unit, I have shown in Fig. 2 an automatic temperature actuated device which serves to open and close the valve 31 for controlling the supply of emulsion or oil to the columnar unit in question. The temperature actuated device shown includes the device $40^a$ having the temperature graduated scale $40^b$. Within the device $40^a$ is a pressure actuated valve which serves to control the delivery of compressed air or the like from the pipe $40^c$ to the pipe $40^d$. The pipe $40^d$ connects to the diaphragm valve $40^e$ which in turn operates the emulsion supply valve 31. Thus the opening and closing of the valve 31 is effected through the medium of compressed air supplied from the pipe $40^c$ through the pipe $40^d$ and under the control of the device $40^a$.

The pressure valve within the device $40^a$ connects by means of a tube $40^f$ with a supply vessel $40^g$ within the columnar unit, the vessel $40^g$ being subjected to the same temperature existing within the columnar unit. Ether or other volatile liquid contained within the vessel $40^g$ will respond rapidly to changes of temperature within the columnar unit, thereby promptly effecting the operation of the pressure valve within the device $40^a$, and correspondingly controlling the supply of compressed air from the pipe $40^c$ to the diaphragm valve $40^e$.

The foregoing construction is illustrated and described simply as an example of one type of arrangement which may be used for automatically regulating the supply of the oil or emulsion according to the temperature within the columnar unit.

As a simple means for supporting each of the columnar units I have shown the same as resting on a bracket 41, best shown in Figs. 3 and 4.

At times it is desirable to jacket the incoming gas manifold. When this is to be done each of the base sections 11 is provided with the jacket 42 having the openings 43 and 44 for the passage of jacket liquor. In like manner it may be desirable, at times, to jacket the columnar units or portions of them. For this purpose I have shown the jackets 45 in Figs. 5 and 6, the jackets of each columnar unit being connected up in series by pipes 47. When the columnar units are jacketed a circulating pump 48 may be provided for causing a constant circulation of the jacketing liquor around the individual columnar units.

As particularly shown in Figs. 3 and 4 each of the units 9 has the brackets 49 across its opposite bottom edges. On these brackets there rest the racks 50 which carry the baffle plates 51.

Ordinarily the baffles will take the form of pivoted plates. However, as modified forms of baffles I have shown in Figs. 7 and 8 two other baffle constructions. The baffles shown in Fig. 7 are triangular in form, while those shown in Fig. 8 are horizontally flat plates which are staggered or off-set with respect to each other so as to interfere with the upward travel of the gas.

With the baffle construction illustrated in Figs. 3 and 4 each baffle rack may be individually removed for replacement or repair by merely removing the corresponding section 9. This is a great advantage for the reason that these baffles may in time require cleaning or replacement, and also for the reason that it may be desirable in setting up some condensers to use one form of baffle, and to use a different form of baffle in setting up other condensers.

While I have herein shown and described certain constructions of condenser and associated parts, still I am not limited to these constructions except as I may limit myself in the claims.

I claim:

1. In a by-product condenser the combination with a gas inlet manifold and a gas delivery manifold, of a plurality of vertical columnar units extending between said manifolds, a partition between the lower end of each columnar unit and the gas inlet manifold, a valve in each of said partitions, a connection for the delivery of fractional precipitate above each of said partitions, a spray nozzle in alinement with the upper end of each columnar unit, and a valve for controlling the delivery of precipitating medium through each of said nozzles, substantially as described.

2. In a by-product condenser the combination with a gas inlet manifold and a gas delivery manifold above the same, of a plurality of vertical columnar units extending between said manifolds, a partition between the lower end of each columnar unit and the gas inlet manifold, a valve in each of said partitions for controlling the rate of gas delivery from the gas inlet manifold to the corresponding columnar unit, a precipitate delivery connection in each columnar unit above the partition thereof, means for preventing the flow of precipitate downward through the valve of the partition, a spray delivery nozzle in alinement with the upper portion of each columnar unit, and a valve for controlling the delivery of spray for each of said nozzles, substantially as described.

3. In a by-product condenser the combination with a gas inlet manifold and a gas delivery manifold located above the same, of a plurality of vertical columnar units extending between said manifolds, means for controlling the flow of gas from the inlet manifold to each columnar unit individually, means for collecting precipitate from the bottom portion of each columnar unit, a spray nozzle in alinement with the upper portion of each columnar unit, and means for individually controlling the spray through each of said nozzles, substantially as described.

4. In a by-product condenser the combination with a gas inlet manifold and a gas delivery manifold above the same, of a plurality of vertical columnar units extending between said manifolds, means for collecting precipitate from the bottom portion of each columnar unit, means for individually controlling the flow of gas from the inlet manifold to each columnar unit, a spray nozzle for directing precipitating medium into the upper portion of each columnar unit, and means for individually controlling the delivery of said medium through each of said nozzles, substantially as described.

5. In a by-product condenser the combination with a gas inlet manifold and a gas delivery manifold above the same, of a plurality of vertical columnar units extending between said manifolds, means for controlling the flow of gas from the inlet manifold to each columnar unit, means for collecting precipitate from the lower portion of each columnar unit, means for directing precipitating medium into the lower portion of each columnar unit, means for individually controlling each of said delivering means, and baffle plates located in each columnar unit between the collecting means and the delivering means, substantially as described.

6. In a by-product condenser the combination with an inlet manifold and a delivery manifold located above the same, of a plurality of columnar units extending between said manifolds, means for controlling the flow of gas from the inlet manifold to each columnar unit, means for delivering precipitating medium into the upper portion of each columnar unit, and baffles located in each columnar unit underneath the said delivering means, substantially as described.

7. In a by-product condenser the combination with an inlet manifold and a delivery manifold, of a plurality of columnar units extending between said manifolds, means for controlling the flow of gas from the inlet manifold to each columnar unit, a spray nozzle for delivering precipitating medium into the upper portion of each columnar unit, a valve for each spray nozzle, a temperature actuated device in communication with the gas in the upper portion of each columnar unit, and an operative connection from each of said temperature actuated devices to the valve of the corresponding spray nozzle, substantially as described.

8. In a by-product condenser the combination with an inlet manifold and a delivery manifold, of a plurality of columnar units extending between said manifolds, means for individually controlling the flow of gas into each columnar unit, means for delivering precipitating medium into the upper portion of each columnar unit, a valve for each of said delivering means, a temperature actuated device within the upper portion of each columnar unit and under the actuation of the temperature of the gases at such point, and an operative connection from each of said temperature actuated devices to the corresponding valve, substantially as described.

9. In a by-product condenser the combination with a columnar unit and gas inlet and delivery connections thereto, of means for controlling the flow of gas into the lower portion of the columnar unit, means for collecting precipitate from the lower portion of the columnar unit, a spray nozzle for directing precipitating medium into the upper portion of the columnar unit, a valve for controlling the flow of precipitating medium from said nozzle, a temperature actuated device in communication with the gas on the interior of the columnar unit adjacent to said nozzle, and an operative connection from said temperature actuated device to the valve of the nozzle, substantially as described.

10. In a by-product condenser the combination with a columnar unit and gas inlet and delivery connections thereto, of means for collecting precipitate from the lower portion of the columnar unit, a spray nozzle for delivering precipitating medium into the upper portion of the columnar unit, means for controlling the delivery of percipitating medium through said nozzle, a temperature actuated device within the columnar unit and to the delivery connection thereof, and an operative connection from said temperature actuated device to the means for controlling the flow of precipitating medium, substantially as described.

11. A unitary by-product condenser comprising a plurality of base sections each having a horizontal bore, all of said bores being mounted in alinement with each other to provide a gas inlet manifold, a plurality of top sections, each top section having a horizontal bore, all of said bores alining with each other to provide a gas delivery manifold, and a columnar unit extending between each base section and the corresponding top section, each columnar unit comprising a series of intermediate sections having vertical bores in alinement with each other, and each intermediate section being provided with supports for carrying baffle units on its interior portion, substantially as described.

12. A unitary by-product condenser comprising a plurality of base sections, each base section having a horizontal bore, all of said horizontal bores alining with each other to provide a gas inlet manifold, and a plurality of top sections, each top section having a horizontal bore, and all of said bores alining with each other to provide a gas delivery manifold, a columnar unit extending between each base section and the corresponding top section, each columnar unit comprising a series of intermediate sections having vertical bores alining with each other, a valved partition between the lower end of each columnar unit and the corresponding base section, and a spray delivering means in each top section in alinement with the upper portion of the corresponding columnar unit, substantially as described.

13. In a by-product condenser the combination with a gas inlet manifold, and a gas delivery manifold, of a plurality of vertical columnar units extending between said manifolds, a partition between the lower end of each columnar unit and the gas inlet manifold, a valve in each of said partitions, a spray nozzle in alinement with the upper end of each columnar unit, and a valve for controlling the delivery of precipitating medium through each of said nozzles, substantially as described.

14. In a by-product condenser the combination with a gas inlet manifold and a gas delivery manifold above the same, of a plurality of vertical columnar units extending between said manifolds, a partition between the lower end of each columnar unit and the gas inlet manifold, a valve in each of said partitions for controlling the rate of gas delivery from the gas inlet manifold to the corresponding columnar unit, means for preventing the flow of precipitate downward through the valve of the partition, and means for deliverying spray into the upper portion of each columnar unit, substantially as described.

15. In a by-product condenser the combination with an inlet manifold and a delivery manifold located above the same, of a plurality of columnar units extending between said manifolds, means for controlling the flow of gas from the inlet manifold to each columnar unit, and means for delivering precipitating medium into the upper portion of each columnar unit, substantially as described.

16. In a by-product condenser the combination with an inlet manifold and a delivery manifold located above the same, of a plurality of columnar units extending between said manifold, means for individually controlling the flow of gas from the inlet manifold to desired columnar units, and means for delivering precipitating medium into the upper portions of desired columnar units, substantially as described.

17. In a by-product condenser the combination with an inlet manifold and a delivery manifold located above the same, of a plurality of gas connections extending between said manifolds, means for individually controlling the flow of gas between the manifolds in each of said connections, and means for delivering precipitating medium into the upper portion of each of said connections, substantially as described.

18. In a by-product condenser the combination with an inlet manifold and a delivery manifold located above the same, of a plurality of gas connections extending between said manifolds, means for individually controlling the flow of gas from the inlet manifold to desired connections, and means for delivering precipitating medium into the upper portions of desired connections, substantially as described.

19. In a device of the class described the combination with a gas flue, of means for delivering precipitating medium into the body of gas flowing through said flue, and means under the control of the temperature of the gas within the flue for controlling the rate of delivery of the precipitating medium.

ARTHUR ROBERTS.

Witnesses:
THOMAS A. BANNING, Jr.,
WM. P. BOND.